3,125,402
AZO DYEING OF POLYETHYLENE TEREPHTHALATE FIBERS AND FIBERS SO PRODUCED
Winfried Kruckenberg, Leverkusen, and Konrad Weis, Cologne-Stammheim, Germany, assignors to Farbenfabriken Bayer Aktiengesellschaft, Leverkusen, Germany, a corporation of Germany
No Drawing. Filed May 10, 1960, Ser. No. 28,009
Claims priority, application Germany May 16, 1959
20 Claims. (Cl. 8—41)

The invention relates to the dyeing of polyamide fibres and polyethylene terephthalate fibres; more particularly it relates to the dyeing of these materials with dyestuffs which correspond to the formula (I)
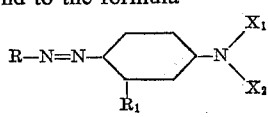

and (II)
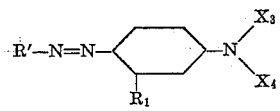

In the above formulae R denotes the radical of a cyano-group-containing, sulfur-free carbocyclic diazo component or the radical of a heterocyclic diazo component which is free from sulfur-containing substitutents whereby R may contain further non-ionic, sulfur-free substituents, and R' the radical of a cyanobenzene which may contain an alkyl, trifluormethyl, halogen, nitro or further cyano substituents, $R_1$ denotes hydrogen, halogen or alkyl, $X_1$ and $X_2$ denote acylated mono- or polyhydroxyalkyl radicals containing 2 to 4 carbon atoms between —N— and —O—, or $X_2$ represents a radical —$C_nH_{2n+1}$, $X_3$ denotes a lower alkylene group carrying a carboxyl group esterified with a lower aliphatic alcohol, $X_4$ denotes a radical identical with $X_3$ or hydrogen, or an aliphatic, araliphatic or aromatic radical which is different from $X_3$ and may be substituted; R, R', $R_1$, $X_1$, $X_2$, $X_3$ and $X_4$ are free from ionic water-solubilizing groups such as sulfonic acid and carboxylic acid groups.

The azo dyestuffs of the Formula I are obtained by coupling a cyano group-containing, sulfur-free carbocyclic diazo compounds or a heterocyclic diazo compound which is free from sulfur-containing substitutents, with an amino-benzene of the formula (III)
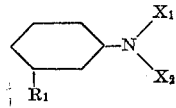

in the p-position to the amino group. In the above formula $R_1$, $X_1$ and $X_2$ have the aforesaid significance.

According to the above definition the hydroxyalkyl radicals in the amino groups of the coupling component (III) contain at least two carbon atoms, i.e. the hydroxy group(s) is (are) not attached to the carbon atom adjacent to the nitrogen atom; β-hydroxyethyl and β,γ-dihydroxypropyl groups are preferred. For esterification of these hydroxy groups, lower fatty acids which may be further substituted, for example, by halogen, cyan or —$OCH_3$, are especially suitable, such as acetic acid, cyano acetic acid, methoxy acetic acid, mono-, di- or trichloro acetic acid, propionic acid and the corresponding substitution products, butyric acid; other esterification (acylating) agents are, e.g. benzoic acid, methane sulfonylchloride and benzene sulfonylchloride.

Coupling of the starting components is effected in an acid medium according to known processes, whereby the coupling component contains the hydroxyalkyl or dihydroxyalkyl groups at the amino group either acylated from the beginning or, if free hydroxyalkyl-amino-group-containing azo components are used the hydroxyalkyl groups are subsequently acylated in the azo dyestuff. Suitable acylating agents for this purpose are inter alia acetic acid chloride, chloroacetic acid, acetic acid, benzene sulfonic acid or acetic acid anhydride.

Examples of diazo components are the following: 2-amino-4-phenyl-thiodiazole-1,3,5; 2-amino-5-nitrothiazole-1,3; 2,4-dicyananiline, 3-chloro-4-cyananiline, 2-cyano-5-chloraniline, 4-cyananiline, 3,4-dicyananiline, 2,4-dicyanotoluidine, 2-cyano-4-nitroaniline, 2-nitro-4-cyananiline, 3-cyananiline, 2,4-dicyan-3,6-dimethyl-aniline or 2,5-dicyananiline.

The azo dyestuffs of the Formula II are obtained by coupling diazotised cyananilines which may contain alkyl, halogen, nitro or other cyan substituents, with aminoaryl compounds of the general formula (IV)
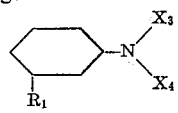

wherein $R_1$, $X_3$ and $X_4$ have the aforesaid significance, in the p-position to the amino group.

In this case, coupling of the starting components is carried out in conventional manner in an aqueous or aqueous-organic, but preferably acid medium. Some of the dyestuffs indicated by the Formulae I and II are known.

The dyeing of the polyamide and polyethylene terephthalate fibres is carried out according to customary methods, e.g. from an aqueous dye-bath at elevated temperature and, if desired, in the presence of dyeing assistants like salts, carriers etc. The dyeings thus obtained are distinguished by good to excellent fastness properties, such as good fastness to washing, to light, to sublimation, to water, to milling, to perspiration, to sulfur, to acid, to rubbing, and they exhibit a good drawing power.

The following examples are given for the purpose of illustrating the invention without, however, restricting it thereto.

Example 1

14.3 parts by weight of 1-amino-3,4-dicyanobenzene are dissolved at 0–15° C. in 46.0 parts by weight of concentrated sulphuric acid and diazotised with good stirring and cooling with 17.0 parts by volume of nitrosyl sulphuric acid (42 g. of sodium nitrite in 100 ml. of concentrated sulphuric acid), and poured on 300 parts by weight of ice after about three hours; a slight nitrite excess is removed with amido-sulphonic acid and the solution filtered. This solution is then combined with a solution of 27.9 parts by weight of N,N-di-(β-hydroxethyl)-m-toluidine, partially neutralised with a dilute sodium hydroxide solution and the coupling is completed by the addition of sodium acetate. The dyestuff is filtered and washed. In the dry state, it is a black-red powder which dissolves in organic solvents such as acetone or alcohol with an orange-red colour. The dyestuff, finely divided by suitable additives, dyes polyamide in bright reddish orange shades of very good fastness to washing and light.

Example 2

The process is carried out as described in Example 1 using N,N-di-(β-hydroxyethyl)-m-toluidine as the coupling component, the dyestuff thus obtained is dried, the product introduced with stirring into acetic acid anhydride heated to 80–100° C., the excess of acetic acid anhydride and the glacial acetic acid formed are distilled off after about 30 minutes, and after drying the same dyestuff is obtained as described in Example 1.

Example 3

80 parts by weight of a mixture of glacial acetic acid and propionic acid (in a ratio of 2:1) are run below 15° C. into 18 parts by volume of nitrosyl sulphuric acid (100 ml. of concentrated sulphuric acid containing 42 g. of sodium nitrite); the mixture is then cooled to −5° C., 14.5 parts by weight of 5-nitro-2-amino-thiazole are then introduced at the same temperature, stirred for a further 15–20 minutes, a further 70 parts by weight of glacial acetic acid and propionic acid (in a ratio of 8:1) are added and stirred at −5° C. for about 4 hours. The excess nitrite is then destroyed by the addition of some urea.

The diazo solution thus obtained is slowly added at −5° C. to 0° C. into a solution of 27.9 parts by weight of acetylated N,N-di-(β-hydroxethyl)-m-toluidine in 80 parts by weight of glacial acetic acid and propionic acid, 150 parts by weight of crystalline sodium acetate are then added and the mixture is kept at 0° C. for about 3 hours. It is then poured into ice water and the precipitated dyestuff filtered off with suction, washed and dried. A black product is obtained which dissolves in organic solvents such as alcohol and acetone with a reddish blue to bluish violet colour, and which being finely divided by suitable additives dyes polyethylene terephthalate fibres and polyamide fibres in intense bluish violet shades.

*Example 4*

17.7 g. of 3-phenyl-5-amino-thiodiazole-1,2,4 are finely powdered, dissolved with stirring in 200 g. of a 85–90% phosphoric acid and then cooled to 0 to 5° C.; at this temperature 170 parts by volume of nitrosyl-sulphuric acid are added dropwise (100 ml. of nitrosyl-sulphuric acid containing 42 g. of nitrite) and the mixture is stirred for a further 5 hours. The resultant diazo solution is then added to a solution of 27.9 g. parts by weight of acetylated N,N-di-(β-hydroxyethyl)-m-toluidine in 75 parts by weight of glacial acetic acid and 150 parts by weight of ice water, the precipitated dyestuff is filtered off with suction, washed and dried. It dissolves in organic solvents with a yellowish red colour and dyes synthetic fibres in the same shade.

When operating in the same manner but using acetylated N,N-di(β-hydroxyethyl)-aniline, a corresponding dyestuff is obtained which dyes polyamide fibres in reddish orange shades.

According to the aforesaid process the dyestuffs listed in the following Table I may be synthesized and dyed in the same or similar manner:

TABLE I

| Example | Shade on polyethylene terephthalate or polyamide fibre |
| --- | --- |
| (5) [structure: O₂N-phenyl(CN)-N=N-phenyl-N(C₂H₄-O-CO-CH₃)₂] | red bordeau. |
| (6) [structure: NC-phenyl(CN)-N=N-phenyl-N(C₂H₄-O-CO-CH₃)₂] | yellowish red. |
| (7) [structure: O₂N-phenyl(CN)-N=N-phenyl(CH₃)-N(C₂H₄-O-CO-CH₃)₂] | bluish bordeau. |
| (8) [structure: NC-phenyl(CN)-N=N-phenyl(CH₃)-N(C₂H₄-O-CO-CH₃)₂] | red. |
| (9) [structure: O₂N-thiadiazole-N=N-phenyl(OCH₃, CH₃)-N(C₂H₄-O-CO-CH₃)₂] | blue. |
| (10) [structure: phenyl-thiadiazole-N=N-phenyl-N(C₂H₄-O-CO-CH₃)₂] | yellow scarlet. |
| (11) [structure: phenyl-thiadiazole-N=N-phenyl(CH₃)-N(C₂H₄-O-CO-CH₂Cl)₂] | yellowish red. |

TABLE I—Continued
| Example | Shade on polyethylene terephthalate or polyamide fibre |
|---|---|
| (12) 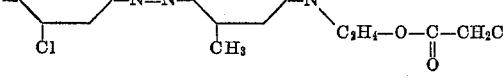 | yellowish orange. |
| (13) 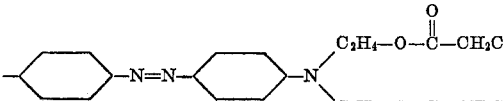 | reddish orange. |
| (14) 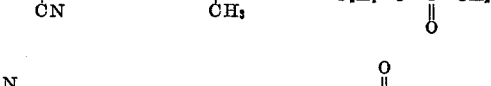 | orange. |
| (15) 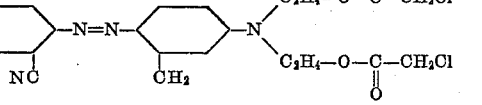 | reddish orange. |
| (16)  | bluish red. |
| (17) 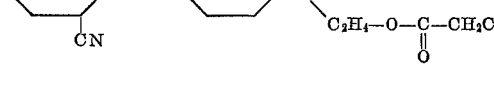 | yellowish orange. |
| (18) 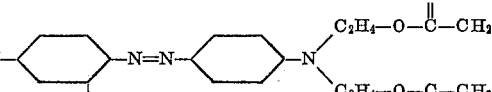 | strong yellowish orange. |
| (19)  | reddish orange. |
| (20) 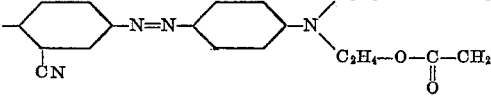 | yellowish red. |
| (21) 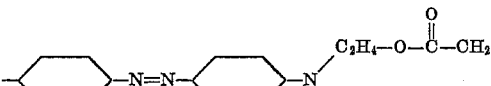 | reddish ruby. |

TABLE I—Continued

| Example | Shade on polyethylene terephthalate or polyamide fibre |
|---|---|
| (22) 4-Cl, 2-CN-phenyl–N=N–(3-CH₃-phenyl)–N(C₂H₄–O–CO–CH₂Cl)₂ | strong yellowish orange. |
| (23) 3-O₂N-5-(thiadiazolyl)–(3-CH₃-phenyl)–N(C₂H₄–O–CO–CH₃)₂ | bluish vio[let] |
| (24) 2,5-(CN)₂-phenyl–N=N–phenyl–N(C₂H₅)(CH₂–CH(O–CO–CH₃)–CH₂–O–CO–CH₃) | orange. |
| (25) 4-NC, 2-CN-phenyl–N=N–phenyl–N(C₂H₅)(CH₂–CH(O–CO–CH₃)–CH₂–O–CO–CH₃) | yellowish scarlet. |
| (26) 4-O₂N, 2-Cl-phenyl–N=N–(3-CH₃-phenyl)–N(C₂H₄–O–CO–CH₂Cl)₂ | yellowish red. |
| (27) phenyl-thiadiazolyl–N=N–(3-CH₃-phenyl)–N(C₂H₄–O–CO–CH₂Cl)₂ | Do. |
| (28) 4-NC, 2-Cl-phenyl–N=N–(3-CH₃-phenyl)–N(C₂H₄–O–CO–CH₂Cl)₂ | yellowish orange. |
| (29) 4-NC, 2-CN-phenyl–N=N–(3-CH₃-phenyl)–N(C₂H₄–O–CO–CH₂Cl)₂ | reddish orange. |
| (30) 2,5-(CN)₂-phenyl–N=N–(3-CH₃-phenyl)–N(C₂H₄–O–CO–CH₂Cl)₂ | orange. |
| (31) 2,5-(CN)₂-phenyl–N=N–(3-CH₃-phenyl)–N(CH₃)(C₂H₄–O–CO–CH₂Cl) | yellowish orange. |

TABLE I—Continued

| Example | Shade on polyethylene terephthalate or polyamide fibre |
|---|---|
| (32) Ph-C(=N-S-N=)C-N=N-C₆H₄-N(CH₃)(C₂H₄-O-CO-CH₂Cl) [thiadiazole] | strong yellowish red. |
| (33) NC-C₆H₃(CN)-N=N-C₆H₄-N(C₂H₄-O-CO-CH₂Cl)₂ | reddish orange. |
| (34) O₂N-C₆H₃(CN)-N=N-C₆H₄-N(C₂H₄-O-CO-CH₂Cl)₂ | bluish red. |
| (35) NC-C₆H₃(CN)-N=N-C₆H₄-N(C₂H₄-O-CO-CH₂Cl)₂ | yellowish orange. |
| (36) NC-C₆H₃(Cl)-N=N-C₆H₄-N(C₂H₄-O-CO-CH₂Cl)₂ | strong yellowish orange |
| (37) Ph-C(=N-S-N=)C-N=N-C₆H₄-N(C₂H₄-O-CO-CH₂Cl)₂ [thiadiazole] | reddish orange. |
| (38) NC-C₆H₃(CN)-N=N-C₆H₃(CH₃)-N(C₂H₄-O-CO-CH₂Cl)₂ | yellowish red. |
| (39) O₂N-C₆H₃(CN)-N=N-C₆H₃(CH₃)-N(C₂H₄-O-CO-CH₂Cl)₂ | reddish ruby. |
| (40) Cl,CN-C₆H₂-N=N-C₆H₃(CH₃)-N(C₂H₄-O-CO-CH₂Cl)₂ | strong yellowish orange. |
| (41) O₂N-C₆H₃(CN)-N=N-C₆H₄-N(CH₃)(C₂H₄-O-CO-CH₂Cl) | reddish ruby. |
| (42) O₂N-C₆H₃(CN)-N=N-C₆H₄-N(CH₃)(C₂H₄-O-CO-CHCl₂) | bluish red. |

TABLE I—Continued

| Example | Shade on polyethylene terephthalate or polyamide fibre |
|---|---|
| (43) [structure: benzothiazole—C(=N)—N=N—C₆H₄—N(CH₃)(C₂H₄—O—CO—CHCl₂)] | orange. |
| (44) NC—C₆H₃(CN)—N=N—C₆H₃(Cl)—N(CH₃)(C₂H₄—O—CO—CHCl₂) | Do. |
| (45) O₂N—C₆H₃(CN)—N=N—C₆H₃(Cl)—N(CH₃)(C₂H₄—O—CO—CHCl₂) | yellowish red. |
| (46) O₂N—C₆H₃(CN)—N=N—C₆H₄—N(CH₃)(C₂H₄—O—CO—C—Cl₃) | bordeau. |
| (47) [benzothiazole—C(=N)—N=N—C₆H₄—N(CH₃)(C₂H₄—O—CO—C—Cl₃)] | orange. |
| (48) NC—C₆H₃(CF₃)—N=N—C₆H₄—N(CH₃)(C₂H₄—O—CO—C—Cl₃) | Do. |

Further carbocyclic and heterocyclic diazo components which may be used in the above examples are 1-amino-2-methyl-4-cyanobenzene, 1-amino-2-cyano-4-methylbenzene, 1-amino-2-methyl-4-cyano-6-chlorobenzene, 1-amino-2-bromo-4-cyanobenzene, 1-amino-2-trifluoromethyl-5-cyanobenzene, 2-aminobenzthiazole, 2-amino-thiodiazole-1,3,4,5-amino-3-benzyl-thiodiazole-1,2,4, 5-amino-3-methylthiodiazole-1,2,4 and others.

Example 49

14.3 parts by weight of 1-amino-2,4-dicyanobenzene are dissolved at 0–15° C. in 460 parts by weight of concentrated sulphuric acid and diazotised with good stirring and cooling with 170 parts by weight of nitrosyl-sulphuric acid (42 g. of nitrite in 100 ml. of sulphuric acid), and poured on about 3000 parts by weight of ice after about 3 hours; a slight nitrite excess is removed with amidosulphonic acid, and the solution is filtered.

This solution is then combined with a solution of 27.9 g. of the compound of the formula

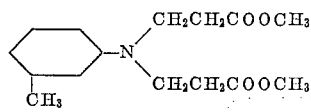

partially neutralised with a dilute sodium hydroxide solution and the coupling completed with sodium acetate. The dyestuff is filtered and washed. In the dry state it forms a black-red powder which dissolves in organic solvents such as acetone or alcohol with a red colour. The dyestuff dyes polyamide fibres in bright scarlet shades.

Example 50

If 14.3 parts by weight of 1-amino-2,4-dicyanobenzene are diazotised in the same manner as that described in Example 49 and the diazo solution thus obtained is combined with a solution of 23.2 parts by weight of N-phenyl-N-β-cyanethyl-β-aminopropionic acid methyl ester, then operating in the same manner as that described in Example 49, a dyestuff is obtained which is dark red in the dry state and dissolves in organic solvents with an orange colour.

Example 51

15.3 parts by weight of 1-amino-3-chloro-4-cyanobenzene are dissolved in 50 ml. of concentrated hydrochloric acid and run with good stirring and cooling into 35 parts by weight of a 20% sodium nitrite solution. Upon completion of the diazotising, the solution is filtered, partially neutralised with a dilute sodium hydroxide solution (pH about 5) and combined with a solution of 23.2 parts by weight of N-phenyl-N-β-cyanethyl-β-aminopropionic acid methyl ester in dilute hydrochloric acid. The coupling is completed by the addition of sodium acetate, the dyestuff precipitating as a light-red powder. The dyestuff is filtered off and washed neutral. In the dry state it is a light-red powder which dissolves in organic solvents with an orange colour and which dyes polyethylene terephthalate fibres orange shade.

According to the same or analogous processes the dyestuffs given in the following Table II may be built up and dyed onto polyamide or polyethylene terephthalate fibres.

TABLE II

| Example | Structure | Shade on polyethylene terephthalate or polyamide fibre |
|---|---|---|
| (52) | $O_2N$—⬡($CN$)—$N=N$—⬡—$N(CH_2COOCH_3)_2$ | orange. |
| (53) | $O_2N$—⬡($CN$)—$N=N$—⬡—$N(C_2H_4COOCH_3)_2$ | bluish red. |
| (54) | $O_2N$—⬡($CN$)—$N=N$—⬡—$NHC_2H_4COOCH_3$ | yellowish red. |
| (55) | $O_2N$—⬡($CN$)—$N=N$—⬡—$N(CH_3)$—$C_2H_4COOCH_3$ | bordeau. |
| (56) | $NC$—⬡($CN$)—$N=N$—⬡—$N(CH_2COOCH_3)_2$ | reddish yellow. |
| (57) | $NC$—⬡($CN$)—$N=N$—⬡—$NHCH_2COOCH_3$ | orange. |
| (58) | $NC$—⬡($CN$)—$N=N$—⬡—$N(C_2H_4COOCH_3)_2$ | Do. |
| (59) | ⬡($CN$, $CN$)—$N=N$—⬡($Cl$)—$N(C_2H_4CN)(C_2H_4COOCH_3)$ | strong yellowish orange. |
| (60) | $NC$—⬡($CN$)—$N=N$—⬡—$N(C_2H_4CN)(C_2H_4COOCH_3)$ | yellowish orange. |
| (61) | $O_2N$—⬡($CN$)—$N=N$—⬡($CH_3$)—$N(C_2H_4CN)(C_2H_4COOCH_3)$ | bluish red. |
| (62) | $NC$—⬡($CN$)—$N=N$—⬡($CH_3$)—$N(C_2H_4CN)(C_2H_4COOCH_3)$ | reddish orange. |
| (63) | ⬡($Cl$, $CN$)—$N=N$—⬡—$N(C_2H_4CN)(C_2H_4-C(=O)-O-CH_3)$ | strong yellowish orange. |
| (64) | ⬡—C(=N—S—N=)C—$N=N$—⬡—$N(C_2H_4CN)(C_2H_4-C(=O)-O-CH_3)$ | reddish orange. |
| (65) | $NC$—⬡($Cl$)—$N=N$—⬡($CH_3$)—$N(C_2H_4CN)(C_2H_4-C(=O)-O-CH_3)$ | yellowish orange. |
| (66) | $NC$—⬡($CN$)—$N=N$—⬡—$N(C_2H_4CN)(C_2H_4-C(=O)-O-CH_3)$ | Do. |

TABLE II—Continued

| Example | Shade on polyethylene terephthalate or polyamide fibre |
|---|---|
| (67) 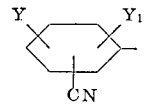 | yellowish orange. |
| (68) 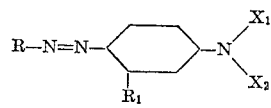 | bluish red. |
| (69) 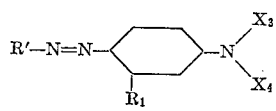 | reddish orange. |

Instead of the diazo components used for the production of the above indicated dyestuffs the carbocyclic diazo components mentioned at the bottom of Table I may be employed.

Example 70

Fibres of polyterephthalic acid glycol esters are introduced at 50° C. into an aqueous bath using a liquor-to-goods ratio of 40:1 and containing per litre 20 g. of benzoic acid and 0.25 g. of one of the dyestuffs listed in the above examples. The dyebath is heated to boiling temperature within 30 minutes and kept at the boil for 1½ to 2 hours. The fibres are then after-washed at 70° C. for 20 minutes with a solution containing per litre of water 4 ml. of a sodium hydroxide solution (38° Bé.), then rinsed in warm water, rendered acid and again rinsed.

The dyeings thus obtained have a good fastness to ironing and sublimation and are especially distinguished by their good light fastness.

Example 71

A dyeing hank of 100 g. of polyamide fibres is introduced at 40° C. into a dyebath containing about 5 litres of water, about 10 g. of soap or of a neutral emulsifier and 1 g. of a finely dispersed dyestuff of the formula

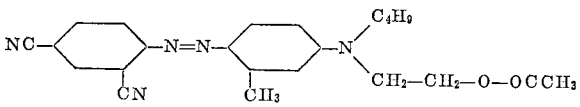

the dyebath is heated to the boil within 20 minutes, kept at this temperature for one hour, and the material is subsequently rinsed and dried. A red dyeing of good fastness to washing and light is obtained.

In the foregoing examples the radical —$C_2H_4$— stands for the group —$CH_2$—$CH_2$—.

We claim:

1. In the process for dyeing polyethylene terephthalate fibres, the improvement which comprises applying onto these fibres an azo dyestuff selected from the group

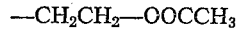

and

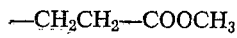

wherein R is a member selected from the group consisting of a cyano group-containing sulfur-free carbocyclic diazo component and a heterocyclic diazo component free of sulfur-containing substituents, R' is a radical of the formula $$\begin{array}{c} Y \quad\quad Y_1 \\ \bigcirc \\ CN \end{array}$$

Y and $Y_1$ stand for members selected from the group consisting of hydrogen, halogen, cyano, nitro, lower alkyl and trifluoromethyl, $R_1$ is a member selected from the group consisting of hydrogen, halogen and lower alkyl, $X_1$ stands for an acylated hydroxy lower alkylene radical containing 2 to 4 carbon atoms between —N— and —O—, $X_2$ stands for a member selected from the group consisting of unsubstituted lower alkyl group and an acylated hydroxy lower alkylene radical containing 2 to 4 carbon atoms between —N— and —O—, $X_3$ means a lower alkylene group carrying a carboxyl group esterified with a lower aliphatic alcohol, and $X_4$ stands for a member selected from the group consisting of hydrogen, a lower aliphatic, benzyl, phenyl radical and a lower alkylene radical carrying a carboxyl group esterified with a lower aliphatic alcohol.

2. Process according to claim 1 which comprises applying a dyestuff of the formula of claim 1 wherein $X_1$ and $X_2$ stand for —$CH_2CH_2$—$OOCCH_3$ groups.

3. Process according to claim 1 which comprises applying a dyestuff of the formula of claim 1 wherein R and R' stand for dicyano-phenyl.

4. Process according to claim 1 which comprises applying a dyestuff of the formula of claim 1 wherein R and R' stands for nitrocyanophenyl.

5. Process according to claim 1 which comprises applying a dyestuff of the formula of claim 1 wherein $X_1$ stands for —$CH_2CH_2CN$ and $X_2$ stands for

—$CH_2CH_2$—$OOCCH_3$

6. Process according to claim 1 which comprises applying a dyestuff of the formula of claim 1 wherein $X_1$ stands for a lower alkyl having 2 to 4 carbon atoms and $X_2$ stands for —$CH_2CH_2$—$OOCCH_3$.

7. Process according to claim 1 which comprises applying a dyestuff of the formula of claim 1 wherein R stands for 5-nitro-thiazole-1,3-yl-2.

8. Process according to claim 1 which comprises applying a dyestuff of the formula of claim 1 wherein $X_3$ stands for —$CH_2CH_2CN$ and $X_4$ stands for

—$CH_2CH_2$—$COOCH_3$

9. Process according to claim 1 which comprises applying a dyestuff of the formula of claim 1 wherein $X_3$ and $X_4$ stand for —$CH_2CH_2$—$COOCH_3$.

10. Process according to claim 1 which comprises applying a dyestuff of the formula of claim 1 wherein $X_3$ stands for lower alkyl having 2 to 4 carbon atoms and $X_4$ stands for —$CH_2CH_2$—$COOCH_3$.

11. Process according to claim 1 which comprises applying a dyestuff of the formula

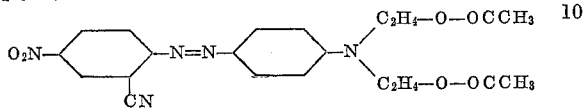

12. Process according to claim 1 which comprises applying a dyestuff of the formula

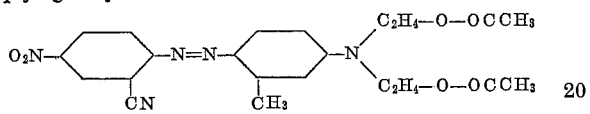

13. Process according to claim 1 which comprises applying a dyestuff of the formula

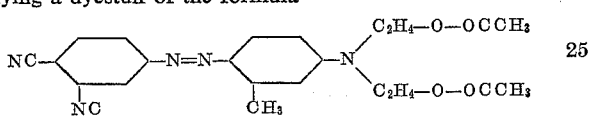

14. Process according to claim 1 which comprises applying a dyestuff of the formula

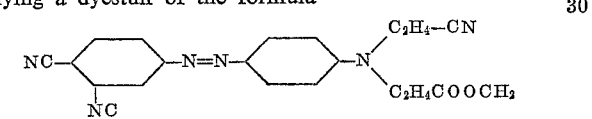

15. Process according to claim 1 which comprises applying a dyestuff of the formula

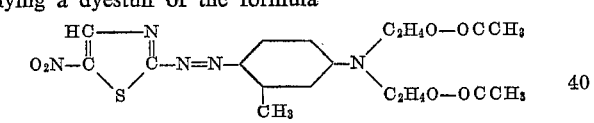

16. Process according to claim 1 which comprises applying a dyestuff of the formula

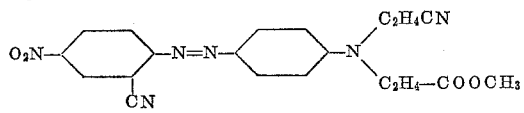

17. Process according to claim 1 which comprises applying a dyestuff of the formula

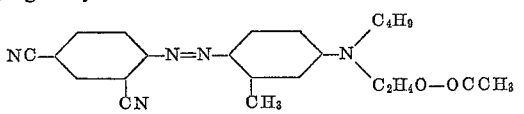

18. Process according to claim 1 which comprises applying a dyestuff of the formula

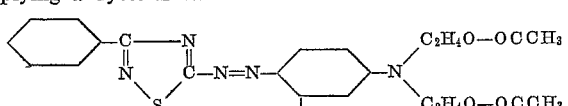

19. Process according to claim 1 which comprises applying a dyestuff of the formula

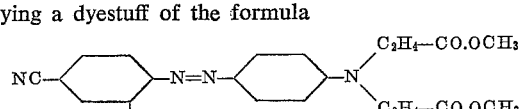

20. Polyethylene terephthalate fibres dyed by the process of claim 1.

References Cited in the file of this patent

UNITED STATES PATENTS

| | | |
|---|---|---|
| 2,173,417 | Huber | Sept. 19, 1939 |
| 2,469,695 | McNally et al. | May 10, 1949 |
| 2,516,303 | Dickey | July 25, 1950 |
| 2,830,043 | Merian | Apr. 8, 1958 |
| 2,888,450 | Kruckenberg | May 26, 1959 |
| 2,955,901 | Kruckenberg | Oct. 11, 1960 |
| 2,980,666 | Merian et al. | Apr. 18, 1961 |